United States Patent
Roberts-Hoffman

(10) Patent No.: US 9,977,530 B2
(45) Date of Patent: May 22, 2018

(54) USE OF ACCELEROMETER INPUT TO CHANGE OPERATING STATE OF CONVERTIBLE COMPUTING DEVICE

(71) Applicant: GOOGLE INC., Mountain View, CA (US)

(72) Inventor: Katie Leah Roberts-Hoffman, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 22 days.

(21) Appl. No.: 14/966,801

(22) Filed: Dec. 11, 2015

(65) Prior Publication Data

US 2017/0168631 A1    Jun. 15, 2017

(51) Int. Cl.
*G06F 3/041* (2006.01)
*G06F 3/01* (2006.01)
(Continued)

(52) U.S. Cl.
CPC ............ *G06F 3/0416* (2013.01); *G06F 1/162* (2013.01); *G06F 1/1618* (2013.01);
(Continued)

(58) Field of Classification Search
CPC ...... G06F 3/017; G06F 3/0416; G06F 1/1618; G06F 1/162; G06F 1/1637; G06F 1/3262; G06F 1/3265
See application file for complete search history.

(56) References Cited

U.S. PATENT DOCUMENTS 6,014,141 A    1/2000 Klein
9,153,106 B1    10/2015 Kuscher et al.
(Continued)

FOREIGN PATENT DOCUMENTS

CN    17972866 A    7/2006
CN    1854983 A    11/2006
(Continued)

OTHER PUBLICATIONS

Serrano, Marcos; Lecolinet, Eric; Guiard, Yves; "Bezel-Tap Gestures: Quick activation of commands from sleep mode on tablets", May 28, 2013, Conference on Human Factors in Computing Systems—Proceedings : pp. 3027-3036. Association for Computing Machinery.*
"Tap Unlock (Screen unlock)", Adarsh TP Tools (https://play.google.com/store/apps/details?id=com.TapUNLOCK&hl=en), printed Dec. 11, 2015, 2 pages.
"Tap the Device to Unlock/Silence/Show clock (Accelerometer)", Maemo.org, (http://talk.maemo.org/showthread.php?t=59606), Thread dated Aug. 2, 2010, printed Dec. 11, 2015, 4 pages.
(Continued)

*Primary Examiner* — Larry Sternbane
(74) *Attorney, Agent, or Firm* — Brake Hughes Bellermann LLP

(57) ABSTRACT

A convertible computing device has an accelerometer to detect tapping gestures on the device, and a mode sensor to determine whether device is in a laptop mode or a tablet mode. The device includes a first physical human input sensor to change an operating state of the device between an OFF state and a non-OFF state and a second physical human input sensor to change an operating state of the computing device. When the device is in the laptop mode, the second physical human input sensor is enabled to change the operating state of the computing device, and when the computing device is in the tablet mode, the second physical human input sensor is disabled from changing an operating state of the device and, instead, the tapping gestures detected by the accelerometer are used to change the operating state of the device.

20 Claims, 12 Drawing Sheets

(51) Int. Cl.
*G06F 1/16* (2006.01)
*G06F 1/32* (2006.01)

(52) U.S. Cl.
CPC .......... *G06F 1/1637* (2013.01); *G06F 1/3262* (2013.01); *G06F 1/3265* (2013.01); *G06F 3/017* (2013.01)

(56) References Cited

U.S. PATENT DOCUMENTS

| | | | |
|---|---|---|---|
| 2003/0169178 A1 | 9/2003 | Jensen et al. | |
| 2005/0062612 A1 | 3/2005 | Smith et al. | |
| 2005/0143137 A1 | 6/2005 | Matsunaga et al. | |
| 2006/0045495 A1* | 3/2006 | Prabhune | G06F 1/162 386/359 |
| 2006/0263068 A1 | 11/2006 | Jung | |
| 2009/0115636 A1 | 5/2009 | Shibata | |
| 2009/0303072 A1 | 12/2009 | Gilling et al. | |
| 2012/0254634 A1 | 10/2012 | Chakra et al. | |
| 2012/0262372 A1* | 10/2012 | Kim | G06F 1/1694 345/158 |
| 2012/0272230 A1* | 10/2012 | Lee | G06F 1/329 717/173 |
| 2012/0289287 A1 | 11/2012 | Kokubo | |
| 2012/0317432 A1 | 12/2012 | Assad et al. | |
| 2013/0104062 A1* | 4/2013 | Reeves | G06F 1/1641 715/761 |
| 2013/0262890 A1 | 10/2013 | Marshall et al. | |
| 2014/0035843 A1* | 2/2014 | Zo | G06F 3/03542 345/173 |
| 2014/0071608 A1* | 3/2014 | Masaoka | G06F 1/1656 361/679.26 |
| 2014/0092140 A1 | 4/2014 | Wadhwa et al. | |
| 2015/0019963 A1 | 1/2015 | Park et al. | |
| 2015/0092323 A1* | 4/2015 | Feng | G06F 1/1671 361/679.1 |
| 2015/0261423 A1* | 9/2015 | Beaumont | G06F 9/4443 715/778 |
| 2015/0277598 A1 | 10/2015 | Aurongzeb et al. | |

FOREIGN PATENT DOCUMENTS

| | | |
|---|---|---|
| EP | 2876538 A1 | 5/2015 |
| WO | 2013/136548 A1 | 9/2013 |
| WO | 2015/096084 A1 | 7/2015 |

OTHER PUBLICATIONS

Jeff Benjamin, "SmartTap: unlock your iPhone just by double-tapping its screen", iDownloadBlog (http://www.idownloadblog.com/2014/05/02/smarttap/), May 2, 2014, 4 pages.

International Search Report and Written Opinion received for PCT Patent Application No. PCT/US2016/066140, dated Apr. 5, 2017, 15 pages.

* cited by examiner

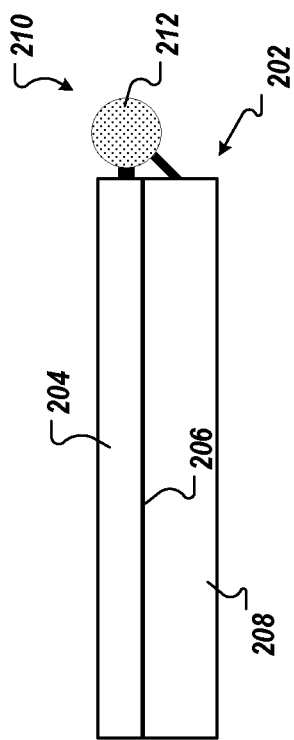

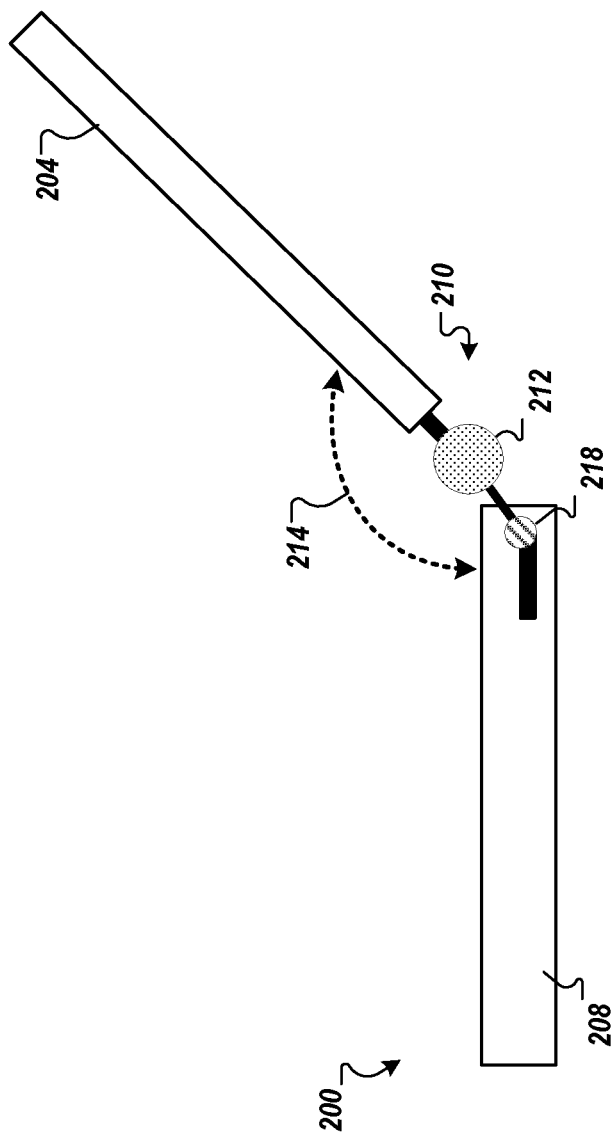

USE OF ACCELEROMETER INPUT TO CHANGE OPERATING STATE OF CONVERTIBLE COMPUTING DEVICE

BACKGROUND

Some computing devices can include a base portion that includes a physical keyboard and a display portion that includes a large display screen. The base portion and the display portion can be coupled to each other, for example, by a hinge. The keyboard can be used by a human to provide input to the device, and the input may be processed to cause certain commands to be executed by the device and to cause changes to occur on the display screen.

In some computing devices that include a display portion and a base portion, the display screen can include a touch screen interface and it may be possible to disable the physical keyboard in the base portion and use touch screen interface to provide input to the device. Such devices, which can be known as convertible devices, can be operated in different modes, in which a plane of the base portion and a plane of the display portion are arranged oriented differently relative to each other. For example, when the plane of the display portion of the plane of the base portion are not parallel to each other, the device may be operated in a "laptop mode" in which the physical keyboard of the base portion is enabled to receive human input, and when the plane of the display portion of the plane of the base portion are parallel to, or close to parallel to, each other, the device may be operated in a "tablet mode mode" in which the physical keyboard of the base portion is disabled from receiving human input.

In some convertible devices, the base portion and the laptop portion can be coupled to each other by a hinge, and the display portion can be rotated about the hinge relative to the base portion by 360 degrees, or at least close to 360 degrees. In such a case, the device may be operated in a laptop mode when the display portion is rotated relative to the base portion by up to a predetermined angle (e.g., 170 degrees), and the device may be operated in a tablet mode when the display portion is rotated relative to the base portion beyond the predetermined angle. In some convertible devices, the base portion and the laptop portion can be detachably coupled to each other (e.g., by one or more mechanisms that hold the display portion relative to the base portion in a laptop mode orientation and that hold the display portion relative to the base portion in a tablet mode orientation. For example, the display portion may be snap-fit coupled to the base portion in laptop mode orientation, and then detached from the base portion and again snap-fit coupled to the base portion, but in a tablet mode orientation.

Computing devices can exist in different power states. For example, a computing device can exist in an OFF, or powered-down, state and in a non-OFF or powered-on state. In addition, a computing device can exist in a low-power sleep state (also known as a suspend state), in which the power drawn by certain components (e.g., a display screen, a main processor, various sensors (e.g., a global positioning sensor) can be sharply reduced. While in a low-power sleep mode, a pervious operating state of the computing device can be preserved (e.g., in volatile memory 109a (e.g., RAM) and/or in non-volatile memory 109b (e.g., flash memory or disk memory)), and then when the device is woken from the low-power sleep state, the previous state of the device can be restored based on the information that was written to memory. Furthermore, a computing device can be placed into a locked screen state, in which a previous state of the device is preserved and where the device can be operated receive input from a human to unlock the screen, but little or nothing more. For example, while the device is in the locked screen state, a user may not be able to control programs executing on the device other than the program that unlocks the screen, or the user may not be able to enter input to cause any changes to occur on the display other than changes related to unlocking the screen.

A computing device can include one or more physical buttons to change the operating state of the computing device. For example, a computing device can include a first physical button (e.g., an ON/OFF button) to change the state of the device between an OFF state and a non-OFF state, and the device can include a second physical button (e.g., a suspend button) to place the device into a low-power state sleep state.

SUMMARY

In a first general aspect, a computing device that is convertible between a laptop mode and a tablet mode includes a base portion having a keyboard, a display portion having a display, an accelerometer configured to detect tapping gestures by a user on the device, and a mode sensor configured to determine whether device is in the laptop mode or in the tablet mode. The computing device also includes a first physical human input sensor configured to change an operating state of the device between an OFF state and a non-OFF state in response to human input to the sensor and a second physical human input sensor configured to change an operating state of the computing device in response to human input to the sensor. When the computing device is determined to be in the in the laptop mode, the second physical human input sensor is enabled to change the operating state of the computing device, and when the computing device is determined to be in the tablet mode, the second physical human input sensor is disabled from changing an operating state of the device and, instead, the tapping gestures detected by the accelerometer are used to change the operating state of the device.

Implementations can include one or more of the following features, alone or in combination with each other. For example, changing the operating state of the device can includes changing the operating state between an unlocked screen state and a locked screen state. The first physical human input sensor can be further configured to, in response to human input to the sensor, change the operating state between a full power state and a low-power sleep state. The first physical human input sensor can be configured to change the operating state of the device between an OFF state and a non-OFF state in response to human input to the sensor of a first duration and can be configured to change the operating state between a full power state and a low-power sleep state in response to human input to the sensor of a second duration.

Changing the operating state of the device can include changing the operating state between a full power state and a low-power sleep state. The first physical human input sensor can be further configured to, in response to human input to the sensor, change the operating state between an unlocked screen state and a locked screen state. The first physical human input sensor can be configured to change the operating state of the device between an OFF state and a non-OFF state in response to human input to the sensor of a first duration and can be configured to change the operating state between an unlocked screen state and a locked screen state in response to human input to the sensor of a second duration.

The first physical human input sensor can include a button located on an edge of the base portion or on an edge of the display portion. The second physical human input sensor can include a button on a base portion. The second physical human input sensor can include a key on the keyboard.

The computing device can include a hinge that connects the base portion to the display portion. The mode sensor can include a magnet in one of the base portion and the display portion and a magnetic sensor in the other one of the base portion and the display portion, where the magnetic sensor is configured to determine the mode of the computing device based on a proximity of the magnet to the magnetic sensor. The mode sensor can include a first accelerometer in one of the base portion and a second accelerometer in the display, where the accelerometers are configured to determine the mode of the computing device based on a comparison of acceleration directions detected by the first and second accelerometers. The tapping gestures detected by the accelerometer used to change the operating state of the device can include a sequence of a predetermined number of tapping gestures within a predetermined period of time, each of the tapping gestures of the sequence causing the accelerometer to generate a signal having an amplitude that exceeds a threshold amplitude.

In another general aspect, a method includes determining whether a convertible computing device is being operated in a laptop mode or in a tablet mode. When it is determined that the convertible computing device is being operated in the tablet mode, then a physical human input sensor located on the convertible computing device is disabled from changing the operating state of the computing device in response to human input to the sensor, whereas, when the computing device is determined to be in the in the laptop mode, the physical human input sensor is enabled to change an operating state of the computing device. In addition, when it is determined that the convertible computing device is being operated in the tablet mode, a tapping gesture by a user on the device is detected, and the operating state of the convertible computing device is changed in response to the tapping gesture.

Implementations can include one or more of the following features, alone or in combination with each other. For example, changing the operating state of the device can include changing the operating state between an unlocked screen state and a locked screen state. The physical human input sensor can include a key on the keyboard on the base portion of the computing device. The tapping gesture used to change the operating state of the device can include a sequence of a predetermined number of tapping gestures within a predetermined period of time, each of the tapping gestures of the sequence causing an accelerometer in the computing device to generate a signal having an amplitude that exceeds a threshold amplitude. When it is determined that the convertible computing device is being operated in the tablet mode, a keyboard in the base portion of the device can be disabled from changing a display of the device.

When it is determined that the convertible computing device is being operated in the laptop mode, the physical human input sensor located on the convertible computing device can be enabled to change an operating state of the computing device, and the convertible computing device can be disabled from having its operating state changed in response to the tapping gesture.

BRIEF DESCRIPTION OF THE DRAWINGS

FIGS. 2A-2F are diagrams that illustrate the example convertible computing device with a display portion placed at various angles with respect to a base portion of the computing device.

DETAILED DESCRIPTION

As described herein, a convertible computing device can include a first physical human input sensor (e.g., an ON/OFF button located on the base portion of the device) that can receive human input and change an operating state of the device between an OFF state and a non-OFF state in response to the human input, and a second physical human input sensor (e.g., a lockscreen button located on a keyboard of the base portion of the device) that can receive human input and change an operating state of the computing device in response to the human input. When the convertible computing device is in the laptop mode, the second physical human input sensor is enabled to change the operating state of the computing device, but when the computing device is in the tablet mode, the second physical human input sensor is disabled from changing an operating state of the device and instead tapping gestures detected by an accelerometer in the device are used to change the operating state of the device.

Thus, when the convertible computing device is in the tablet mode, and the keyboard is not readily accessible to the user, the user can utilize tapping gestures on the device to change the operating state of the device rather than using the second physical human input sensor to change the operating state. Utilizing a tapping gesture to perform this change of operating state provides a very fast way to change the operating state of the device (nearly as fast as hitting a button) as compared with navigating on the touch screen interface to an icon to change the operating state. In addition, utilizing a tapping gesture, rather than a touchscreen gesture, to perform this change of operating state prevents accidental conflicts with other touchscreen gestures that are not intended to trigger a change of operating state. Similarly, because the accelerometer when attached to a microcontroller could be operated while drawing only a small amount of power, it could remain enabled when the device is in the low-power sleep state, and then tapping gestures detected by the accelerometer could be used to wake up the device from the low-power sleep state without using the ON/OFF button.

Figure 1:
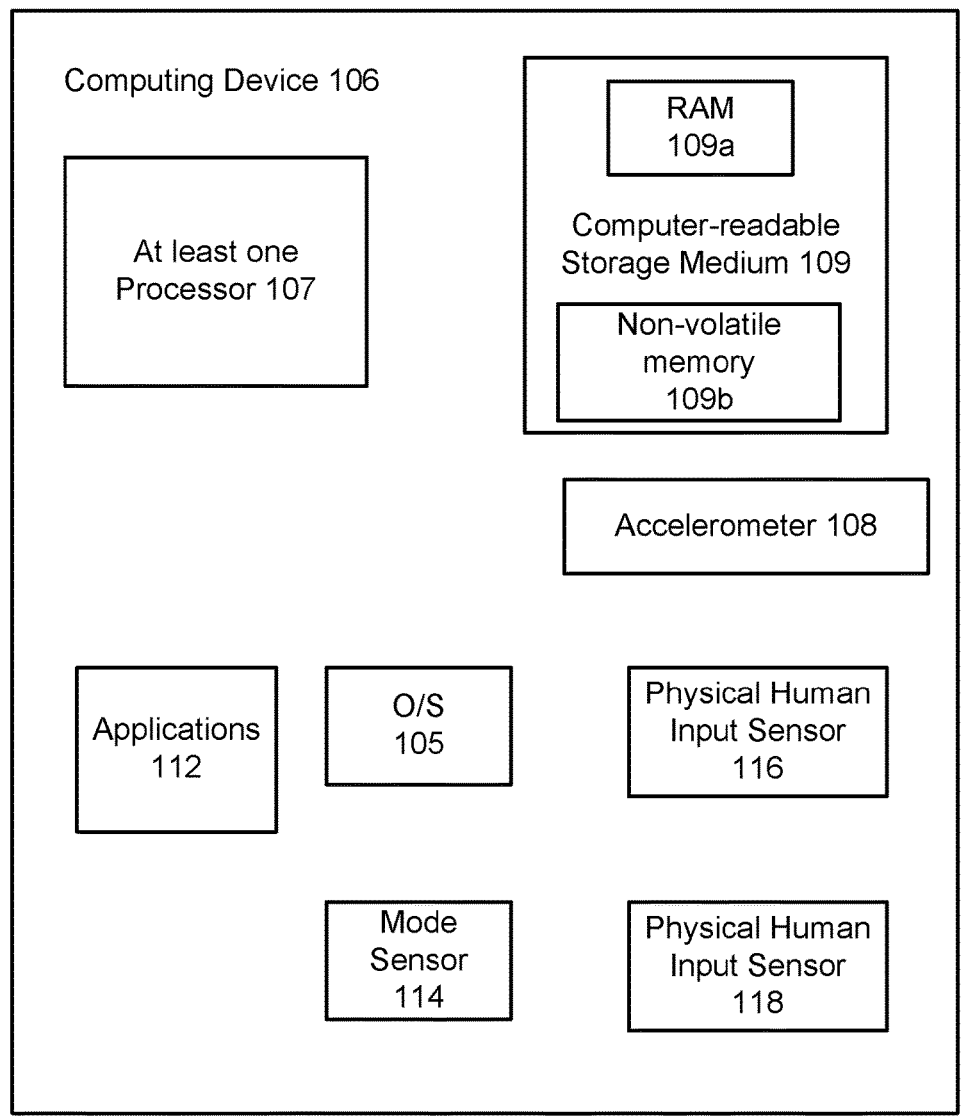
FIG. 1 is a schematic block diagram of a convertible computing device.
Figure 1:
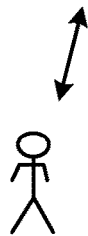

FIG. 1 illustrates a computing device 106 that may take the form of a convertible computing device computer that includes a base portion and a display portion and that can be operated in a laptop mode or a tablet mode. Other forms of the computing device 106 are also possible. The display portion can include a display screen that can include a touchscreen configured to receive human input through a physical interaction between a human and the touchscreen.

An implementation of the computing device 106 being operated in a laptop mode is illustrated in FIG. 2C. In the standard mode, the user can interact with various human interface devices included in the base portion of the computing device while viewing the touchscreen. In addition, the touchscreen can receive input from the user. The display portion of the computing device may be rotated so that the back of the display portion contacts the bottom of the base portion to allow the computing device to be used, for example, in a tablet mode. An implementation of the computing device 106 being operated in a tablet mode is illustrated in FIG. 2F. For the computing device to be used in these multiple modes, the display portion of the computing device can rotate/pivot approximately 360 degrees with respect to the base portion of the computing device. For example, the display portion can be rotated from a closed position of the computing device, where the display portion contacts an upper surface of the base portion to a fully opened position (tablet mode), where the display portion contacts a lower surface of the base portion. FIG. 2A and FIG. 2F, respectively, illustrate examples of these positions.

In some implementations, a dual pivot hinge can connect a display portion to a base of a computing device. A dual pivot hinge can include two pivot structures, which, in some implementations are the same type of structure, and in other implementations are different types of structures. The diameter of each pivot structure can be the same or different, and a first pivot structure can be placed vertically above the second pivot structure. The first pivot structure can be coupled to the display portion of the computing device and the second pivot structure can be coupled to the base portion of the computing device. In some cases, each pivot structure can utilize the same type of friction elements. In other cases, each pivot structure can utilize different types of friction elements. In addition, when connecting the display portion to the base of the computing device, wires can be run from electronics included in the base portion of the computing device (e.g., a motherboard) to components included in the display portion of the computing device (e.g., a touchscreen display) and vice versa.

The computing device 106 may include an operating system 105, at least one processor 107, and a non-transitory computer-readable storage medium 109. The non-transitory computer-readable storage medium 109 may include executable instructions, that when executed, cause the at least one processor 107 to implement functionalities of the operating system 105 and of applications 112.

The operating system 105 may include an operating system such as the Windows operating system, Mac OS, Linux, Chrome OS, Android, Symbian, or iPhone OS, to name a few examples. Consequently, the applications 112 may include virtually any application that may run on the underlying operating system 105 or platform. Examples of such applications are well-known and too numerous to mention in any detail, but generally include web browsers, document processing applications, gaming applications, email applications, image editing or presentation software, a web browser, and/or virtually any type of application capable of operating on an operating system.

The computing device 106 can include a first physical human input sensor 116 and the second physical human input sensor 118. The first and second physical human input sensors 116, 118 each can include one or more physical buttons, switches, knobs, keys (e.g., on a keyboard). The physical human input sensors are distinguished from graphical user interface elements displayed on a display screen and which may be triggered by a user's interaction with the graphical user interface element (e.g., by touching the graphical user interface element when it is displayed on a touchscreen, by navigating a pointer on the display screen to the user interface element (e.g., with a touchpad or a mouse) and then issuing a triggering command (e.g., by tapping on the touchpad or clicking on a mouse button)).

The first physical human input sensor 116 can receive human input, and, in response to the received human input, the sensor 116 can generate a signal that causes a change in an operating state of the computing device 106 between an OFF state and a non-OFF state (e.g., powered on, and a low-power sleep state, or in a locked screen state). For example, in one implementation, physical human input sensor 116 can include a physical ON/OFF button, and when a user presses the ON/OFF button, the state of the computing device 106 can be changed between an OFF state and a non-OFF state. For example, when the device 106 is OFF, pressing the first physical human input sensor 116 can cause the device to be powered on, and when the device 106 is in a non-OFF state pressing on the ON/OFF button can cause the device to power down and enter the OFF state.

The second physical human input sensor 118 can receive human input, and, in response to the received human input, the sensor 118 can generate a signal that causes a change in an operating state of the computing device—e.g., a change of operating state that does not involve transitioning the computing device 106 to or from an OFF state. For example, an operating state of the computing device can be changed between a powered on, unlocked state and a locked screen state. In another example, an operating state of the computing device 106 can be changed between a powered on operating state and a low-power sleep mode. For example, in one implementation, second physical human input sensor 118 can include a lockscreen button, and when a user presses the lockscreen button, the state of the computing device 106 can be changed from a powered-on operating state to a locked screen state. In another example implementation, the second physical human input sensor 118 can include a suspend button, and when a user presses the suspend button, the state of the computing device 106 can be changed between a powered-on operating state and a low-power sleep state.

The computing device 106 can include one or more accelerometers 108. The accelerometer(s) 108 can be located in the base portion and/or the display portion of the computing device 106. The accelerometer(s) 108 can include a device that produces a signal in response to experiencing an acceleration or a force (which is proportional to an acceleration through Newton's second law), including piezoelectric, piezoresistive, capacitive, and micro electro-mechanical systems (MEMS) components.

The computing device 106 can include one or more mode sensors 114 that detect whether the device is operating in a laptop mode or in a tablet mode. For example, for a convertible computing device having a 360 degree hinge that couples the base portion to the display portion, a mode sensor 114 can be used to determine whether a plane of the display portion is at an angle, within a predetermined range of angles (e.g., 5-130 degrees), compared to a plane of the base portion, in which case the computing device 106 would be determined to be operating in a laptop mode or whether the display screen of the display portion is facing outward from the computing device, with its plain being substantially parallel to a plane of the base portion, in which case the computing device would be determined to be operating in a tablet mode.

The mode sensor can include a variety of components. For example, in one implementation, the mode sensor 114 can include a first accelerometer in the base portion and a second accelerometer in the display portion. When the directions of acceleration due to gravity experienced by the two sensors is substantially parallel, the device may be determined to be operating in a tablet mode. When the computing device 106 is determined to be operating in a tablet mode one or more human interface devices (HIDs) in the base portion (e.g., a keyboard, a trackpad) can be automatically disabled to avoid accidental inputs from those HIDs, since it can be assumed that inputs through those HIDs are unintentional when the computing device is operated in the tablet mode. When the directions of acceleration due to gravity experienced by the two sensors is substantially anti-parallel, the device may be determined to have the display portion in a closed position relative to the base portion, such that the display screen of the display portion is substantially hidden from the user, and therefore the device may be automatically placed into a suspend mode, the lock screen mode, or an OFF state when the display portion and the base portion are oriented in this manner. When the directions of acceleration due to gravity experienced by the two sensors is different and indicates that the plane of the display portion is oriented at an angle within a predetermined range of angles compared to a plane of the base portion, the computing device 106 may be determined to be operating in a laptop mode.

The mode sensor 114 also can include magnets and magnetic sensors located in the base portion and the display portion. For example, a magnet in a back surface the display portion in close proximity to a magnetic sensor in a back surface of the base portion can indicate that the device is operating in the tablet mode, while the lack of a magnetic signal at the magnetic sensor can indicate that the device is operating in the laptop mode. In another example, a magnet in a front surface of the display portion in close proximity to a magnetic sensor in a front surface of the base portion can indicate that the device is in a closed position.

When the computing device 106 is determined to be operating in the tablet mode, the second physical human input sensor 118 can be prevented from controlling an operating state of the computing device. Instead, the accelerometer(s) 108 can provide the input to control the operating state of the computing device. For example, in response to a predetermined input to the accelerometer hundred eight (e.g., a predetermined number of taps on the computing device 106, each tap exceeding a threshold amplitude), the accelerometer 108 can generate a signal that is used to change the operating state of the computing device 106.

The applications 112 may include or use, or be associated with, one or more Application Programming Interfaces (APIs) to communicate with the accelerometer 108, where such APIs may be light-weight, consistent, customizable, and easy to implement within or among various applications 112. Moreover, such APIs may rarely, if ever, need to be updated or maintained by the user in order for the user to programmably control the operation and display of the accelerometer 108. Instead, such updates may be managed by an administrator or other provider of the accelerometer 108, or the computing device 106, so that the user of the device 106 is unburdened of associated efforts and responsibilities. The operating system 105, the applications 112, and the APIs may issue commands to receive signals from and send signals to the accelerometer 108. Therefore, the accelerometer 108 can be programmed to control different functionality of the computing device 106 and can be programmed to control, or to transition between, different operating states of the computing device 106.

FIG. 2A is a diagram that illustrates an example convertible computing device 200 in a closed position from a side-view (the right side 202) where the display portion 204 is substantially in contact with the upper surface 206 of the base portion 208. In the closed position, the display portion 204 can be considered at a zero-degree angle with respect to the base portion 208.

Figure 2B:
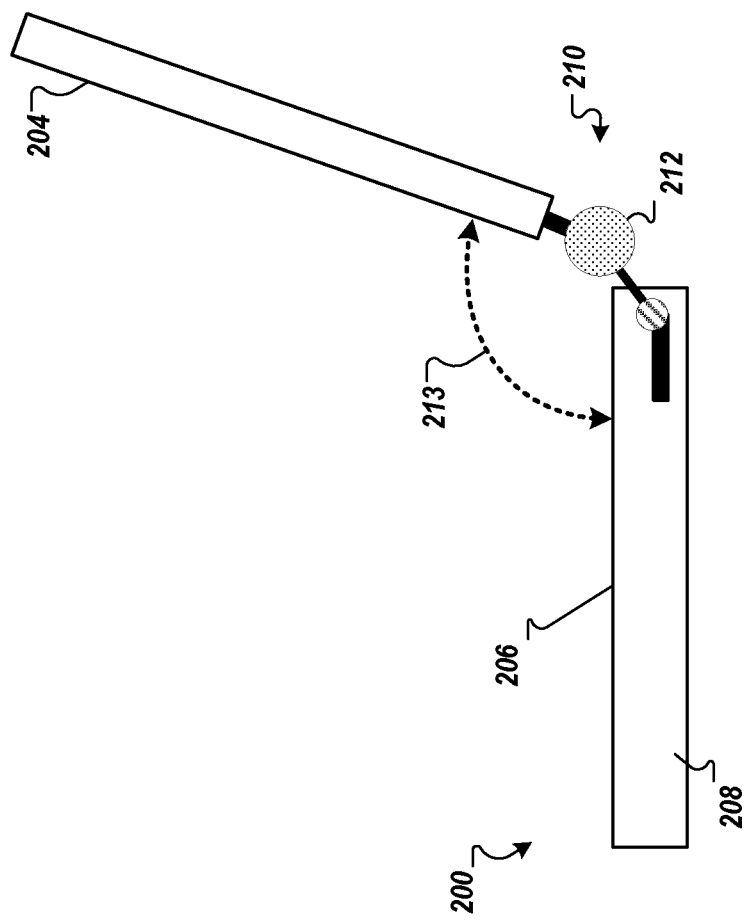

FIG. 2B illustrates an example configuration of the computing device 200 where the display portion 204 is rotated about the main hinge 212 of the dual pivot hinge 210 and placed in a 120-degree position. In the 120-degree position, the display portion 204 can be oriented at an angle 213 that is approximately 120-degrees (i.e., 120 degrees±5 degrees) with respect to the base portion 208, which remains stationary. In the 120-degree position, for example, the user can interact with the one or more input devices (e.g., a keyboard, a touchpad, etc.) included in the base portion 208 while viewing a display included in the display portion 204. In some cases, the placement of the display portion 204 in this position can be a factor of the type of computing device. For example, a user using a laptop computer may place the display portion 204 at greater than the 120-degree angle with respect to the base portion 208. A user of a notebook or other computing device that is smaller than the laptop computer may place the display portion 204 at an angle less than the 120-degree angle with respect to the base portion 208.

Movement of the display portion from the closed position shown in FIG. 2A to the 120-degree position shown in FIG. 2B is accomplished by the rotational movement of the main hinge 212 as a user applies a force to the display portion 204, pushing a top edge of the display portion up and away from the base portion 208. The rotational movement of the main hinge 212 provides/controls the movement of the display portion 204 while the base hinge 218 remains stationary (it does not rotate).

FIG. 2C illustrates an example configuration of the computing device 200 where the display portion 204 is rotated about the main hinge 212 of the dual pivot hinge 210 and placed in a 135-degree position. In the 135-degree position, the display portion 204 is at an angle 214 that is approximately 135-degrees (i.e., 135 degrees±5 degrees) with respect to the base portion 208, which remains stationary. In the 135-degree position, for example, the user can interact with the computing device in a manner similar to when the display portion 204 of the computing device 200 is in the 120-degree position.

Figure 2D:
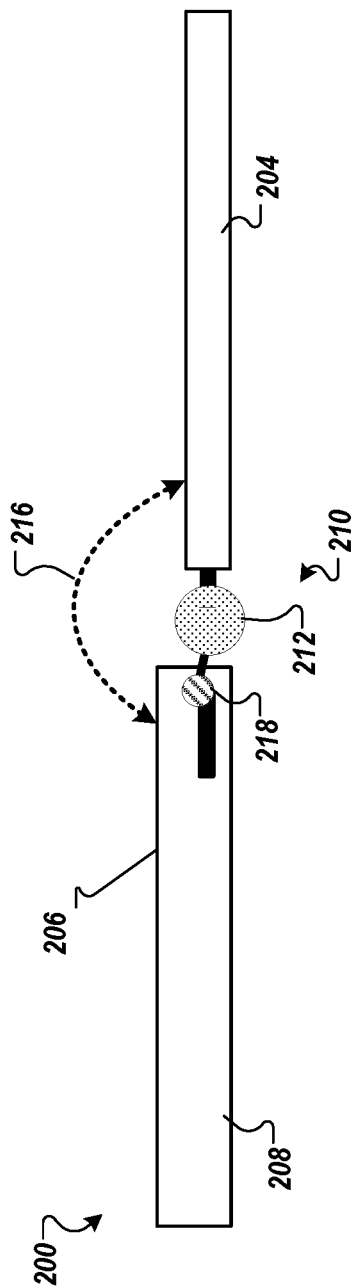

FIG. 2D illustrates an example configuration of the computing device 200 where the display portion 204 is rotated about dual pivot hinges (e.g., dual pivot hinge 210) from the zero-degree position to a 180-degree position. In the 180-degree position, the display portion 204 is at an angle 216 that is approximately 180-degrees (i.e., 180 degrees±5 degrees) with respect to the base portion 208. Movement of the display portion 204 from the closed position (as shown in FIG. 2A) to the 180-degree position can be accomplished by the rotational movement of the main hinge 212, when moving the display portion 204 from the closed position to the 135-degree position, and then by the rotational movement of the base hinge 218, when moving the display portion 204 further from the 135-degree position to the 180-degree position.

Figure 2E:
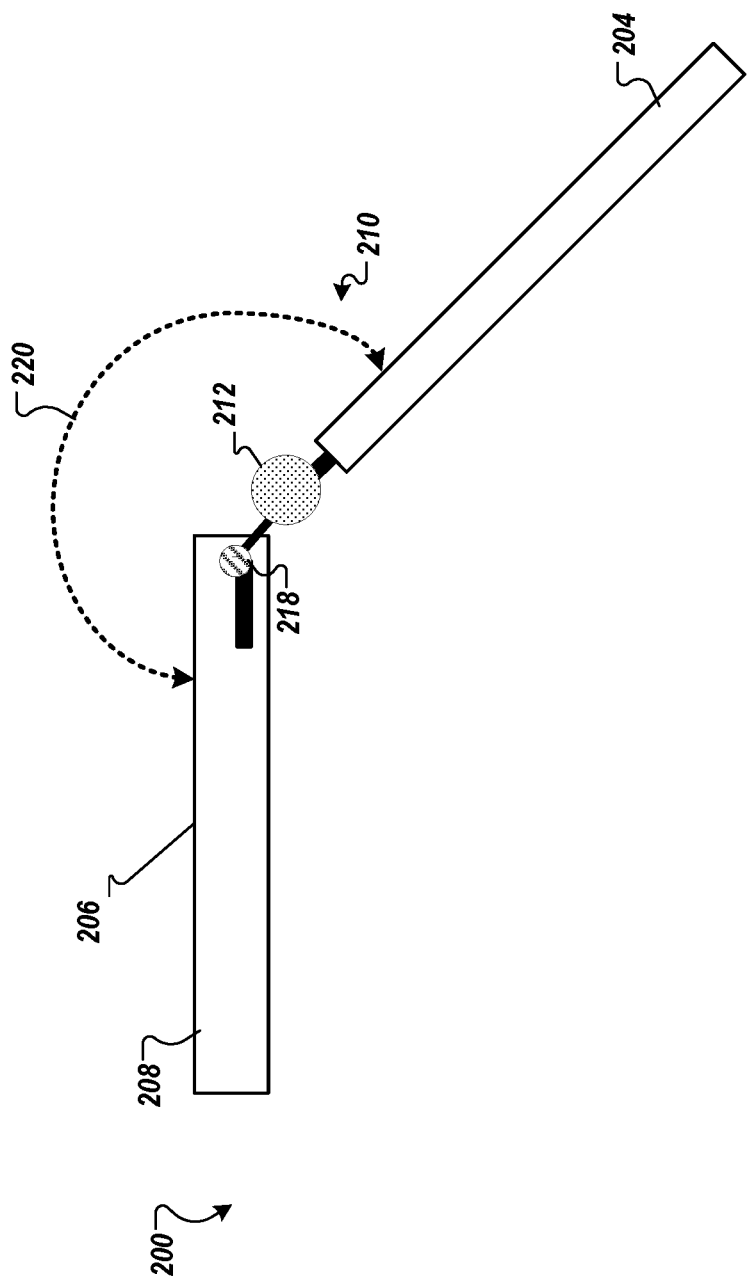
Figure 2F:
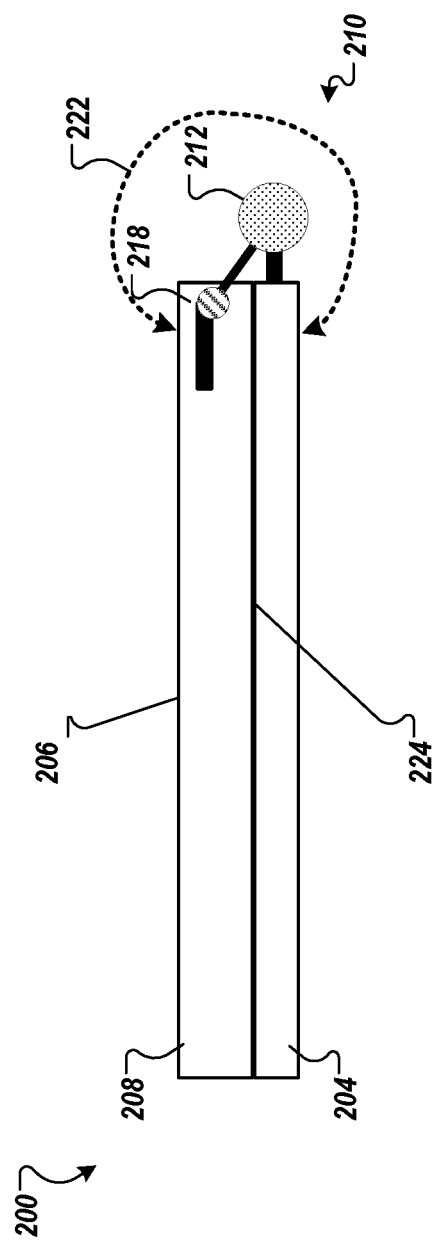

FIG. 2E illustrates an example configuration of the computing device 200 where the display portion 204 is rotated about dual pivot hinges (e.g., dual pivot hinge 210) from the zero-degree position to a 225-degree position. In the 225-degree position, the display portion 204 is at an angle 220 that is approximately 225-degrees (i.e., 225 degrees±5 degrees) with respect to the base portion 208.

Movement of the display portion 204 from the closed position (as shown in FIG. 2A) to the 225-degree position is accomplished by the rotational movement of the main hinge 212, when moving the display portion 204 from the closed position to the 135-degree position, and then by the rotational movement of the base hinge 218, when moving the display portion 204 further from the 135-degree position to the 225-degree position.

FIG. 2F illustrates an example configuration of the computing device 200 where the display portion 204 is rotated about dual pivot hinges (e.g., dual pivot hinge 210) from the zero-degree position to a 360-degree position. In the 360-degree position, the display portion 204 is at an angle 222 that is approximately 360-degrees (i.e., 360 degrees±5 degrees) with respect to the base portion 208. In this 360-degree position, the display portion 204 is in contact with a lower surface 224 of the base portion 208.

Movement of the display portion 204 from the closed position (as shown in FIG. 2A) to the 360-degree position is accomplished by the rotational movement of the main hinge 212, when moving the display portion 204 from the closed position to the 135-degree position, by the rotational movement of the base hinge 218, when moving the display portion 204 from the 135-degree position to the 225-degree position, and then by the rotational movement of the main hinge 212, when moving the display portion 204 from the 225-degree position to the 360-degree position.

In addition to the form factors described with respect to FIGS. 2A-2F, the convertible computing device 106 can take the form of a device in which the display portion is detachably coupled to the base portion. For example, display portion can be coupled to the base portion through mechanical, electrical, and/or magnetic connectors in a first position that corresponds to a laptop mode and can be coupled to the base portion through one or more mechanical, electrical, and/or magnetic connectors in a second position that corresponds to a tablet mode. To switch the device between the laptop mode and the tablet mode, the display portion can be detached from the base portion and then placed into the position that corresponds to the tablet mode.

Figure 3:
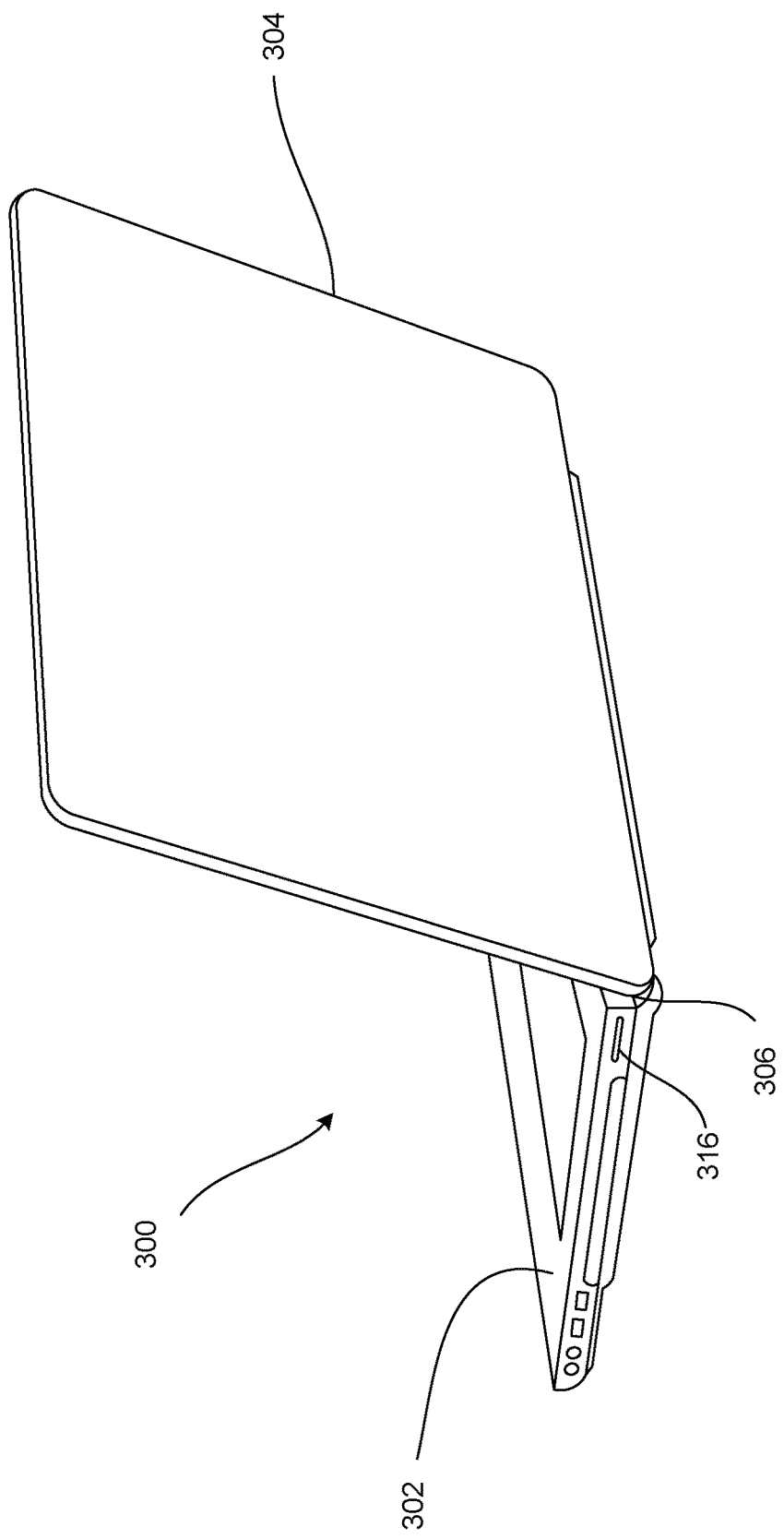
FIG. 3 illustrates the example convertible computing device of FIG. 1 configured as a laptop computer.

FIG. 3 is a perspective back view of an example convertible computing device 300 used in a laptop mode. The convertible computing device 300 includes a base portion 302, which may include one or more user input devices (e.g., a keyboard, a trackpad, etc.) and a housing that houses electrical components (e.g., one or more memory devices configured for storing executable instructions, one or more processors configured for executing instructions, etc.) and a display portion 304 that includes a display screen, which may include a touchscreen, that displays information to a user. The display portion 304 can be attached to the base portion 302 by a hinge 306, such that the display portion 304 can be placed in a closed position when it is parallel to the base portion 302, and can be opened into an open position by rotating the display portion 304 about an axis defined by the hinge 306 relative to the base portion 302. In addition, the display portion 304 can be placed in an open position, with the convertible computing device 300 being in a tablet mode, when the display portion is rotated about the axis defined by the hinge 306 from the closed position until it is parallel to the base portion 302, but on the other side of the base portion from the side of the base portion it is next to when in the closed position. The display portion 304 can have a generally thin rectangular shape, such that it has two primary opposed surfaces. A first surface (not shown) that faces the base portion when the display portion is in the closed position can include the high-resolution programmable display screen that is configured to display text-based information to a user.

The computing device 300 can include a first physical human input sensor 316 that can be used to change an operating state of the computing device between an OFF state and a non-OFF state. In some implementations, the first physical human input sensor 316 can include an ON/OFF button that can be triggered by the touch of a user to change the state of the device. In some implementations, the ON/OFF button can be activated by a user pressing on the button. For example, when the computing device 300 is in an OFF state, depressing the button can cause the computing device to be powered on and a boot sequence to be initiated. When the computing device 300 is in a non-OFF state (e.g., a powered on state, a low-power sleep state, or in a locked screen state), depressing the button for more than a predetermined amount of time can cause the state of the computing device to be changed into an OFF state. In addition, depressing the button for less than a predetermined amount of time can cause the state of the computing device to be changed between a powered-on state and a low-power sleep state. In some implementations, the second human input sensor 318 can include a switch, knob, etc. that can be operated to change the operating state of the computing device.

In some implementations, the first physical human input sensor 316 can be located on an edge of the base portion 302 of the computing device 300 or on an edge of the display portion 304 of the computing device, so that the sensor 316 is easily accessible to the user while the device is operated in both the laptop mode and in the tablet mode.

Figure 4:
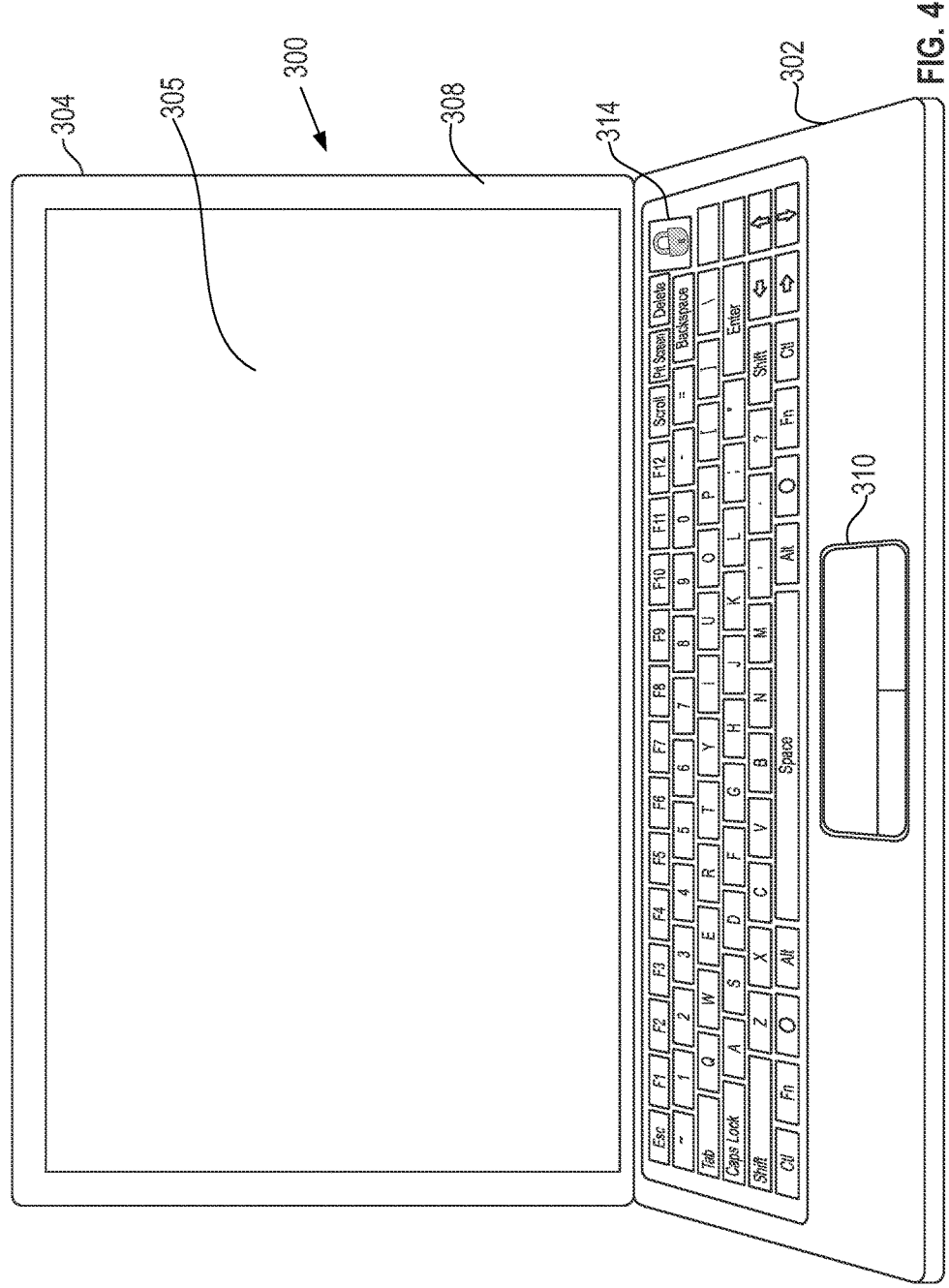
FIG. 4 illustrates the example convertible computing device of FIG. 1 configured as a laptop computer.

FIG. 4 is a perspective front view of the example convertible computing device 300 used in a laptop mode. As shown in FIG. 4, the display portion 304 of the computing device 300 can include a display screen 305 that is surrounded by a bezel 308. The display screen can include a touchscreen. The base portion 302 of the computing device 300 can include one or more human interface devices (HIDs), including, for example, a trackpad 310 that can be used for navigating and operating a pointer on the display screen 305 and a keyboard 312 that can include a plurality of keys that can be operated to provide input to the computing device 300.

The computing device 300 can include a second physical human input sensor 318 that can be used to change an operating state of the computing device. In some implementations, the second physical human input sensor 318 can include an key of the keyboard 312 that can be triggered by the touch of a user to change an operating state of the device (e.g., by a user pressing the key). In some implementations, the second physical human input sensor can include a sensor that is separate from the keyboard. In some implementations, the second human input sensor 318 can include a switch, knob, etc. In some implementations, the second human input sensor 318 can be triggered to change an operating state of the computing device 300 into a locked screen state. For example, triggering the second human input sensor 318 can cause the computing device to be transitioned from a powered-on state to a locked screen state to ensure the privacy and security of the user's data and applications on the computing device 300. In some of these implementations, the first human interface device 316 can be used to change an operating state of the computing device between an OFF state and a non-OFF state and to change the state of the computing device between a powered-on state and a low-power sleep state.

When the computing device 106 is in the low-power sleep state, it can be brought out of the low-power sleep state by different techniques. For example, in some implementations, the computing device 106 can be brought out of the low-power sleep state in response to a signal from the accelerometer 108 indicating that the device has been bumped, tapped, or picked up by a user. In some implementations, the computing device may remain in the low-power sleep state when the accelerometer 108 provides a signal indicating that the device is being jostled while being carried, for example, in a bag or backpack, by the user. In some implementations, the accelerometer 108 may be coupled to a microcontroller that draws only a small amount of power relative to a main processor (e.g., a CPU), so that the microcontroller can remain on and able to receive and interpret signals from the accelerometer 108, even when the device is in the low-power sleep state. In some implementations, the accelerometer 108 may be coupled to a touchscreen controller that draws only a small amount of power relative to a main processor (e.g., a CPU), so that the touchscreen controller can remain on and able to receive and interpret signals from the accelerometer 108, even when the device is in the low-power sleep state.

In some implementations, the second human input sensor 318 can be triggered to change the state of the computing device between a powered-on state and a low-power sleep state. In some of these implementations, the first human interface device 316 can be used to change an operating state of the computing device between an OFF state and a non-OFF state and to change the state of the computing device between a powered-on state and a locked screen state.

Figure 5:
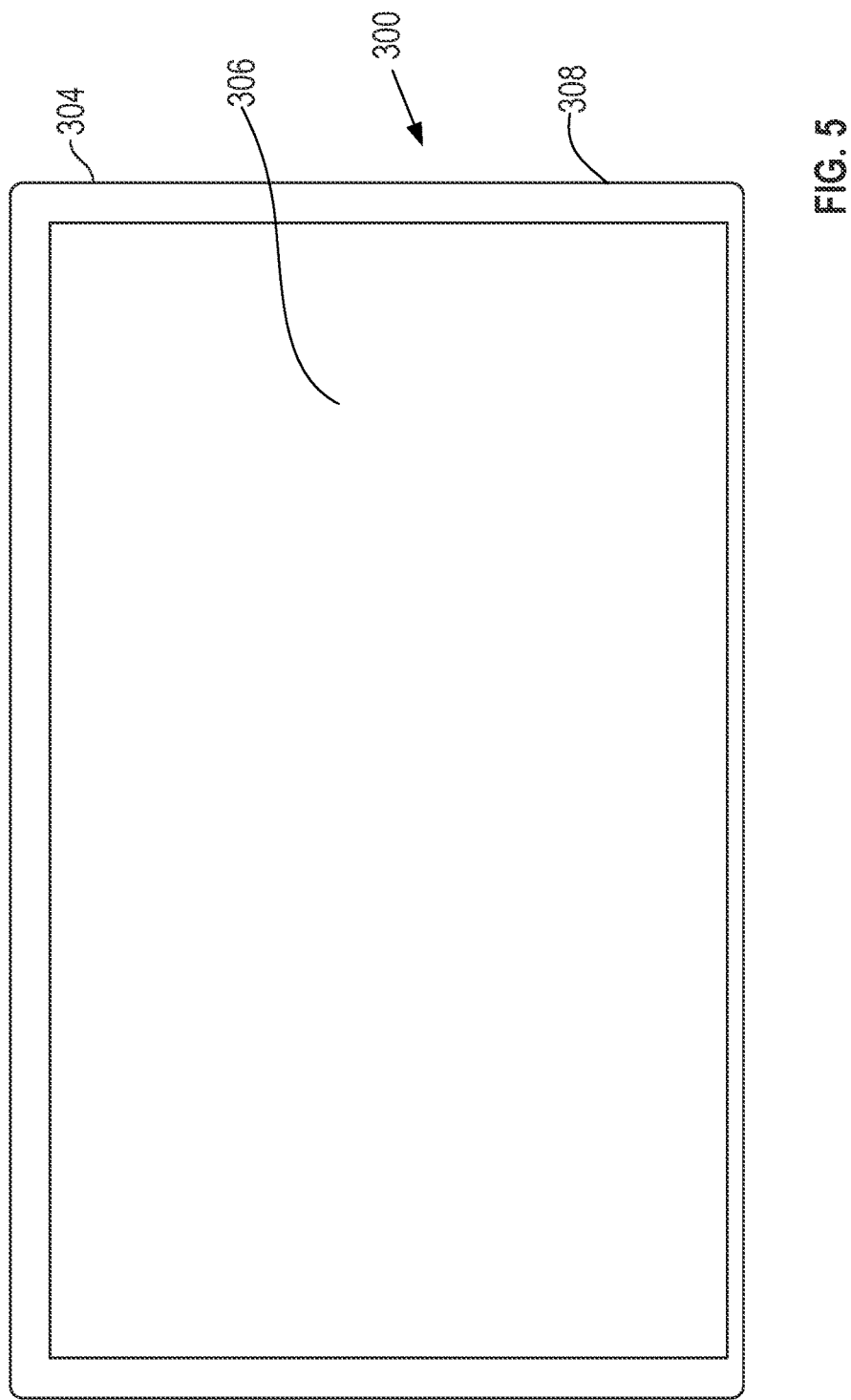
FIG. 5 illustrates the example convertible computing device of FIG. 1 configured as a tablet computer.

FIG. 5 is a front view of the example convertible computing device 300 used in a tablet mode. As shown in FIG. 5, when the device is operated in the tablet mode, the keyboard 312 is generally unavailable to the user to provide input to the device. Rather, the user provides input to the screen through the touchscreen. The display portion 304 of the computing device 300 can include a display screen 305 that is surrounded by a bezel 308. The display screen can include a touchscreen.

In some implementations, a signal from the mode sensor 114 indicating that the computing device 300 is being operated in a tablet mode can cause one or more human interface devices (e.g., the keyboard, the trackpad, etc.) in the base portion of the device to be disabled, such that physical interaction with those human interface devices does not cause a change in the display or the operation of the device. The second human input sensor 318 also can be disabled when the computing device 300 is determined to be operating in the tablet mode. Then, when the second human input sensor 318 is disabled, the functionality of the second human input sensor 318 when the computing device 300 is in the laptop mode can be replaced by one or more accelerometers located in the base portion and/or the display portion. For example, in response to the accelerometer(s) detecting a predetermined number of taps or knocks on a housing of the computing device within a predetermined time period, each tap or knock having amplitude that exceeds predetermined amplitude, an operating state of the computing device can be changed. For example, the operating state can be changed from a powered-on operating state to a locked screen state. Then, to unlock the screen and to return the computing device 300 its unlocked, powered-on state, a user may enter a predetermined input to the device (e.g., a password, personal identification number, a fingerprint, a pattern swiped onto the touchscreen, etc.).

In some implementations, a signal from the mode sensor 114 indicating that the computing device 300 is being operated in a tablet mode can cause both the first physical human input sensor and the second physical human input sensor to be disabled, such that physical interaction with those sensors does not cause a change in the operating state of the device. For example, when a physical human input sensor is located on an edge of the computing device, the sensor may be touched inadvertently when the user is operating the device in tablet mode, even though the user does not desire to change the operating state of the device. Therefore, disabling both of the physical human input sensors while the device is in table mode can avoid inadvertent changes in the operating state of the device. While the first physical human input sensor is disabled, its functionality can be performed by the functionality of the accelerometer 108. For example, a first predetermined signal generated by the accelerometer in response to tapping gesture (e.g., two knocks on the device) by the user to the device, can cause operating state of the device to be changed from a powered-on state to a low-power sleep state. A second predetermined signal generated by the accelerometer in response to tapping gesture (e.g., five or more knocks) by the user to the device, can cause operating state of the device to be changed from a powered-on state to a locked screen state. A third predetermined signal generated by the accelerometer in response to tapping gesture by the user to the device, can cause operating state of the device to be changed from a powered-on state to an OFF state.

Figure 6:
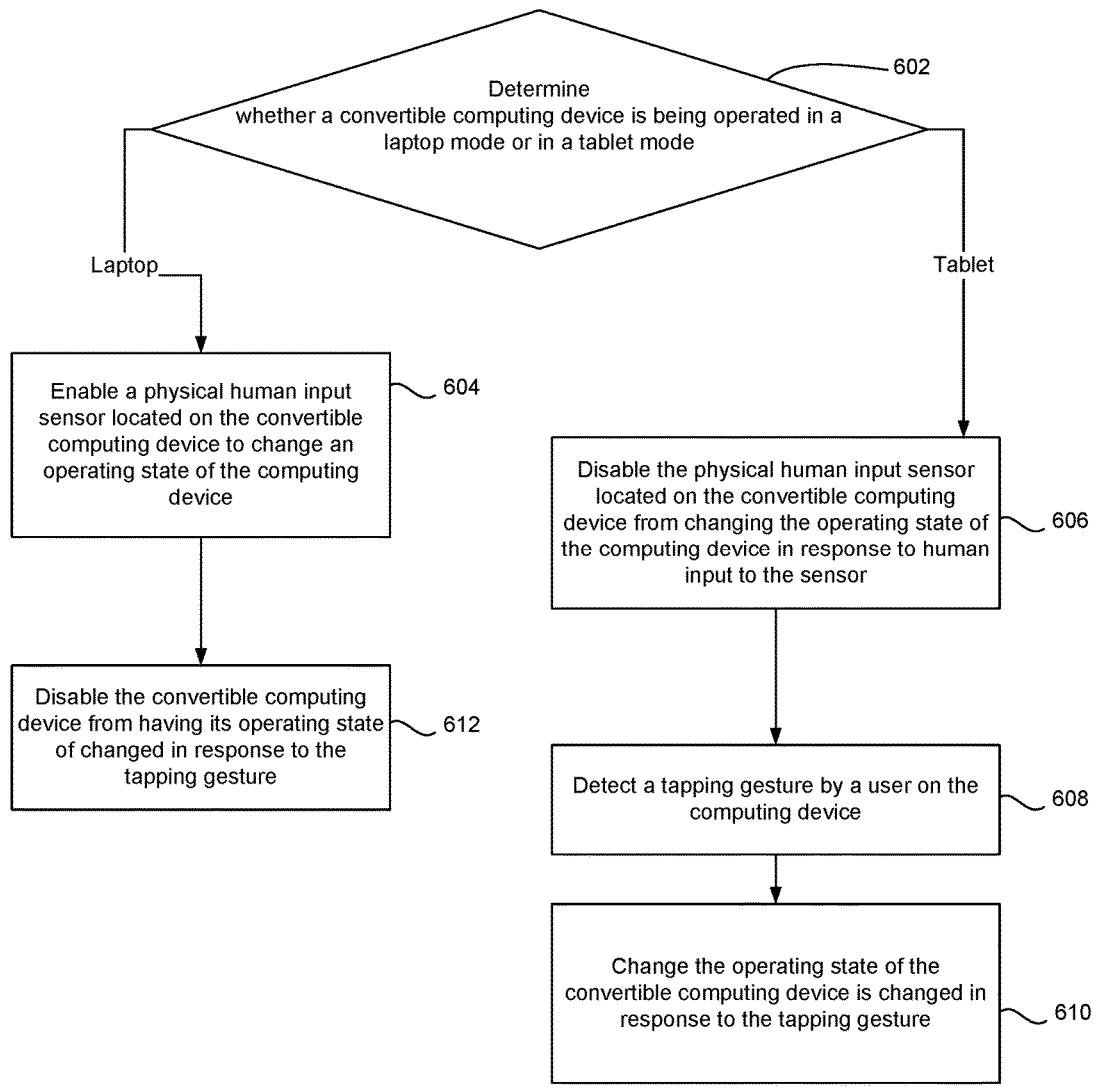
FIG. 6 is a flowchart illustrating example operations of the computing device of FIG. 1.

FIG. 6 is a flowchart illustrating example operations of the convertible computing devices described herein. In the process 600, whether a convertible computing device is being operated in a laptop mode or in a tablet mode is determined (602). When it is determined that the convertible computing device is being operated in the laptop mode, a physical human input sensor located on the convertible computing device is enabled to change an operating state of the computing device (604).

When it is determined that the convertible computing device is being operated in the tablet mode, the physical human input sensor located on the convertible computing device is disabled from changing the operating state of the computing device in response to human input to the sensor (606), a tapping gesture by a user on the computing device is detected (608), and the operating state of the convertible computing device is changed in response to the tapping gesture (610). When it is determined that the convertible computing device is being operated in the laptop mode, the convertible computing device can be disabled from having its operating state of changed in response to the tapping gesture (612).

Figure 7:
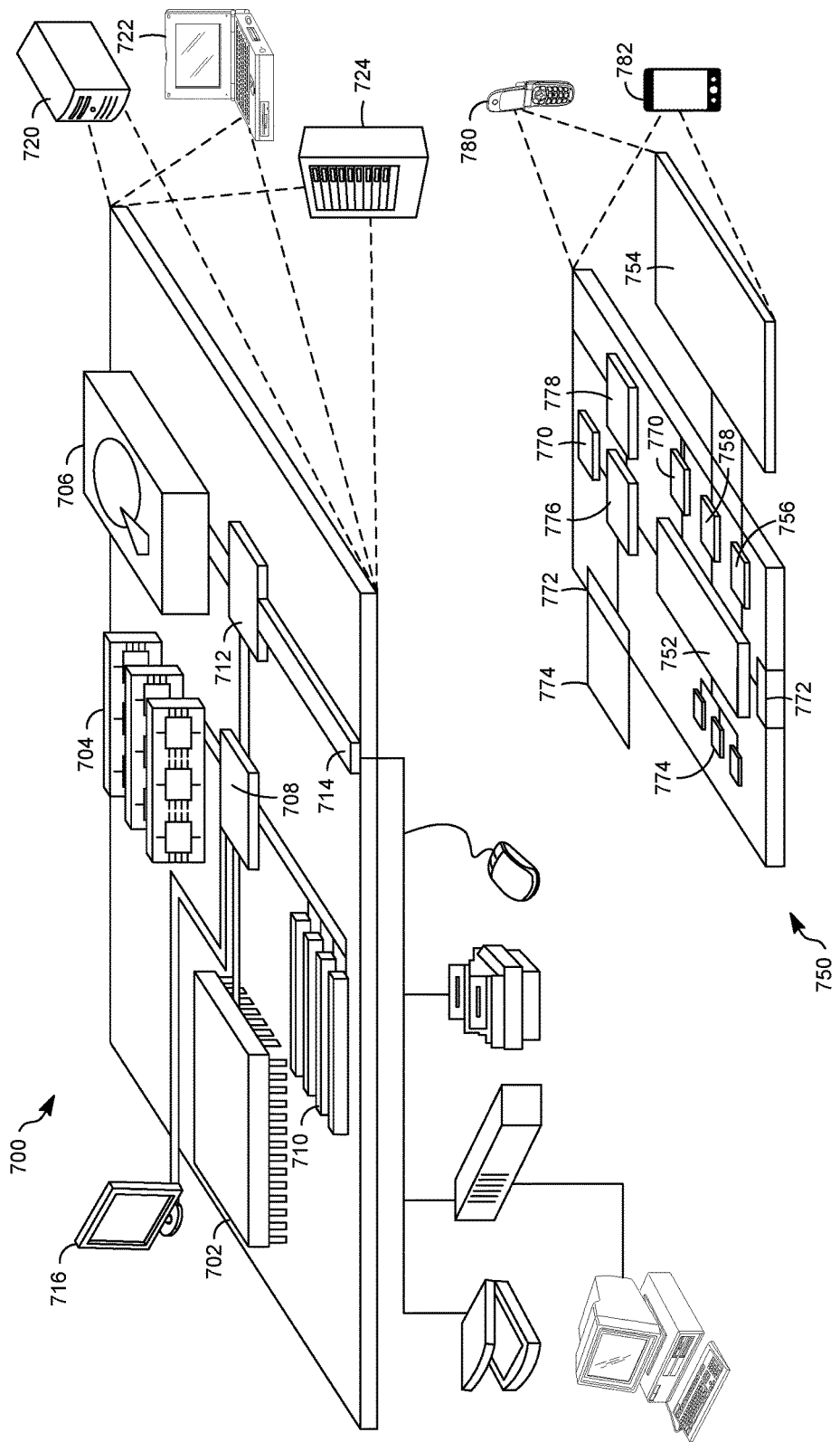
FIG. 7 is a schematic diagram of an example computing device and an example mobile computing device, which may be used with the techniques described here.

FIG. 7 shows an example of a computer device 700 and a mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710 shown, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented in a personal computer such as a laptop computer 722 or a tablet computer. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

It will be appreciated that the above implementations that have been described in particular detail are merely example or possible implementations, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Furthermore, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A computing device, being convertible between a laptop mode and a tablet mode, the computing device comprising:
   a base portion including a keyboard;
   a display portion including a display;
   an accelerometer configured to detect tapping gestures by a user on the computing device;
   a mode sensor configured to determine whether the computing device is in the laptop mode or in the tablet mode;
   a first physical human input sensor configured to, in response to human input to the sensor, change an operating state of the computing device; and
   a second physical human input sensor configured to, in response to human input to the sensor, change an operating state of the computing device,
   wherein, when the computing device is determined to be in the laptop mode, the second physical human input sensor is enabled to change the operating state of the computing device, and
   wherein, when the computing device is determined to be in the tablet mode, the first and second physical human input sensors are disabled from changing an operating state of the device, and multiple, different tapping gestures made on the display portion, detected by the accelerometer, are used to change the operating state of the computing device.

2. The computing device of claim 1, wherein changing the operating state of the computing device includes changing the operating state between an unlocked screen state and a locked screen state.

3. The computing device of claim 2, wherein the first physical human input sensor is further configured to, in response to human input to the sensor, change the operating state between a full power state and a low-power sleep state.

4. The computing device of claim 3, wherein the first physical human input sensor is configured to change the operating state of the computing device between an OFF state and a non-OFF state in response to human input to the sensor of a first duration and is configured to change the operating state between a full power state and a low-power sleep state in response to human input to the sensor of a second duration.

5. The computing device of claim 1, wherein changing the operating state of the computing device includes changing the operating state between a full power state and a low-power sleep state.

6. The computing device of claim 5, wherein the first physical human input sensor is further configured to, in response to human input to the sensor, change the operating state between an unlocked screen state and a locked screen state.

7. The computing device of claim 6, wherein the first physical human input sensor is configured to change the operating state of the computing device between an OFF state and a non-OFF state in response to human input to the sensor of a first duration and is configured to change the operating state between an unlocked screen state and a locked screen state in response to human input to the sensor of a second duration.

8. The computing device of claim 1, wherein the first physical human input sensor includes a button located on an edge of the base portion or on an edge of the display portion.

9. The computing device of claim 1, wherein the second physical human input sensor includes a button on the base portion.

10. The computing device of claim 1, wherein the second physical human input sensor includes a key on the keyboard.

11. The computing device of claim 1, further comprising a hinge that connects the base portion to the display portion.

12. The computing device of claim 1, wherein the mode sensor includes a magnet in one of the base portion and the display portion and a magnetic sensor in the other one of the base portion and the display portion, the magnetic sensor being configured to determine the mode of the computing device based on a proximity of the magnet to the magnetic sensor.

13. The computing device of claim 1, wherein the mode sensor includes a first accelerometer in one of the base portion and a second accelerometer in the display, the accelerometers being configured to determine the mode of the computing device based on a comparison of acceleration directions detected by the first and second accelerometers.

14. The computing device of claim 1, wherein the tapping gestures detected by the accelerometer used to change the operating state of the computing device include a sequence of a predetermined number of tapping gestures within a predetermined period of time, each of the tapping gestures of the sequence causing the accelerometer to generate a signal having an amplitude that exceeds a threshold amplitude.

15. A method comprising:
determining whether a convertible computing device is being operated in a laptop mode or in a tablet mode; and
when it is determined that the convertible computing device is being operated in the tablet mode:
disabling first and second physical human input sensors located on the convertible computing device, which when the convertible computing device is determined to be in the laptop mode are enabled to change an operating state of the convertible computing device, from changing the operating state of the convertible computing device in response to human input to the sensor;
detecting a tapping gesture on a display area of a display by a user on the computing device; and
changing the operating state of the convertible computing device in response to the tapping gesture.

16. The method of claim 15, wherein changing the operating state of the computing device includes changing the operating state between an unlocked screen state and a locked screen state.

17. The method of claim 15, wherein one of the first and second physical human input sensors includes a key on a keyboard on a base portion of the computing device.

18. The method of claim 15, wherein the tapping gesture used to change the operating state of the computing device includes a sequence of a predetermined number of tapping gestures within a predetermined period of time, each of the tapping gestures of the sequence causing an accelerometer in the computing device to generate a signal having an amplitude that exceeds a threshold amplitude.

19. The method of claim 15 further comprising:
when it is determined that the convertible computing device is being operated in the tablet mode, disabling a keyboard in the base portion of the computing device from changing the display of the computing device.

20. The method of claim 15, further comprising, when it is determined that the convertible computing device is being operated in the laptop mode:
enabling one of the physical human input sensors located on the convertible computing device to change an operating state of the computing device, and
disabling the convertible computing device from having its operating state changed in response to the tapping gesture.

* * * * *